Figure 1:
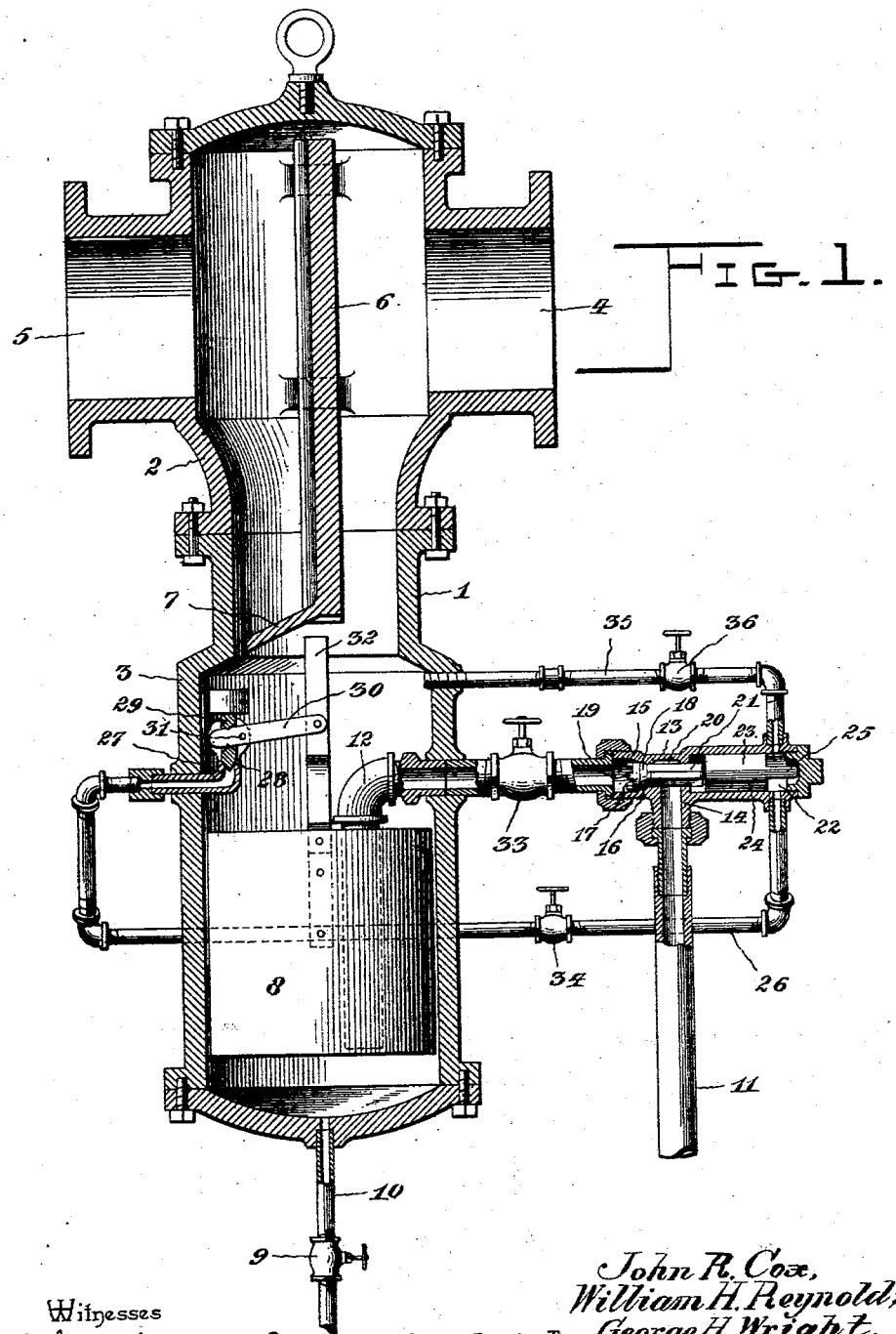

No. 634,659. Patented Oct. 10, 1899.
J. R. COX, W. H. REYNOLDS & G. H. WRIGHT.
STEAM SEPARATING TRAP.
(Application filed Jan. 31, 1899.)

(No Model.) 2 Sheets—Sheet 1.

Witnesses
John F. Denflerwid
D. T. Hochauster

John R. Cox,
William H. Reynolds, Inventors
George H. Wright,
By their Attorneys,
C. A. Snow & Co.

THE NORRIS PETERS CO., PHOTO-LITHO., WASHINGTON, D. C.

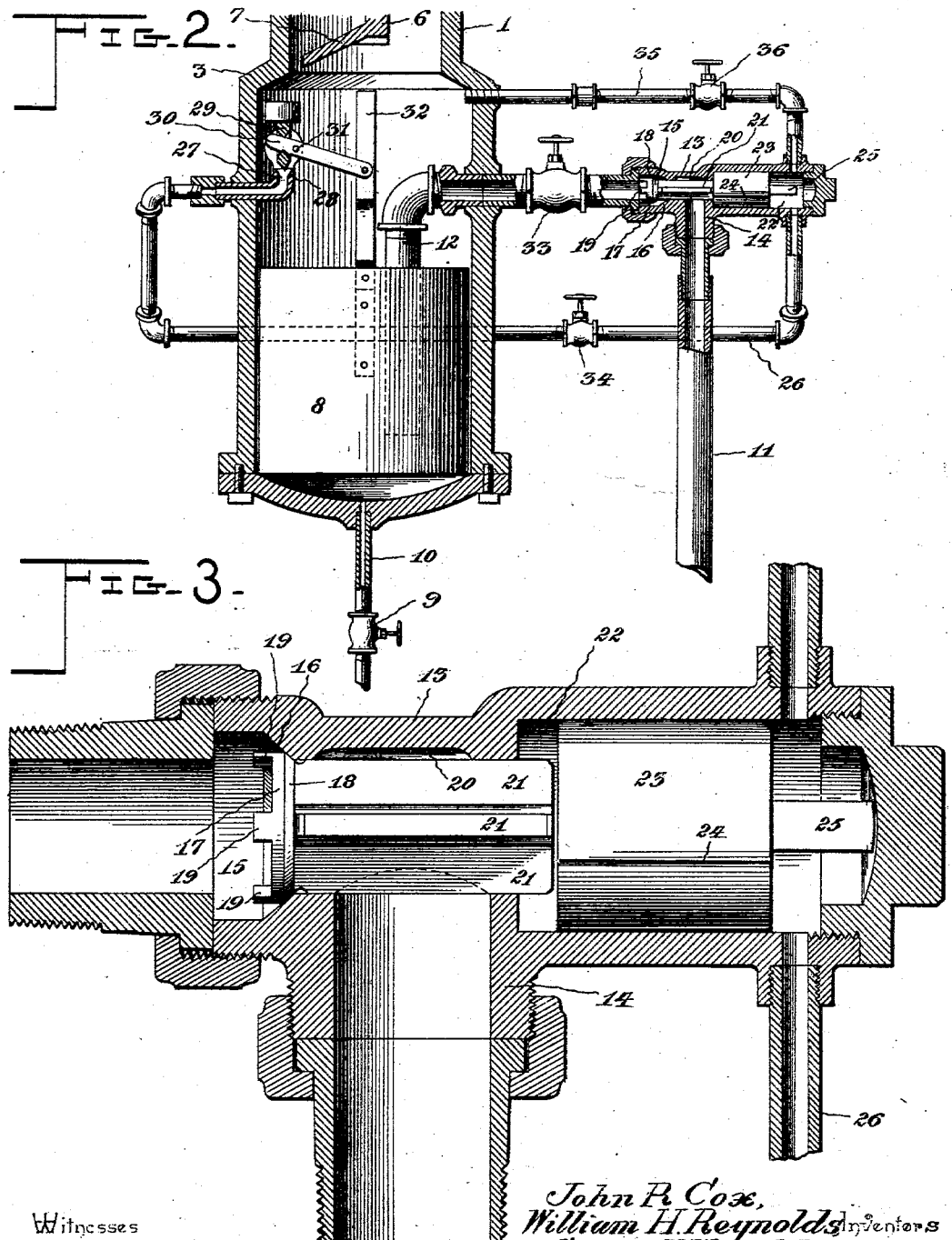

UNITED STATES PATENT OFFICE.

JOHN R. COX, WILLIAM H. REYNOLDS, AND GEORGE H. WRIGHT, OF GALVESTON, TEXAS.

STEAM-SEPARATING TRAP.

SPECIFICATION forming part of Letters Patent No. 634,659, dated October 10, 1899.

Application filed January 31, 1899. Serial No. 704,017. (No model.)

*To all whom it may concern:*

Be it known that we, JOHN R. COX, WILLIAM H. REYNOLDS, and GEORGE H. WRIGHT, citizens of the United States, residing at Galveston, in the county of Galveston and State of Texas, have invented a new and useful Steam-Separating Trap, of which the following is a specification.

This invention relates to an improved steam-separating trap or steam-eliminator for securing a supply of dry steam to an engine or like machinery; and it has for its object to provide an apparatus of this character having simple and efficient means for eliminating water, entrained moisture, grease, or other impurities from steam at any pressure and automatically discharging the water of condensation and other impurities, while at the same time permitting the steam to pass in a thoroughly-dried condition to the point of use.

To this end the invention primarily contemplates certain improvements in the construction of the steam-separating trap covered in the pending application, Serial No. 676,420, filed April 4, 1898, and has in view improved means for controlling the valves which coöperate with the float to provide for an automatic discharge of the accumulated water of condensation and other impurities.

With these and other objects in view, which will readily appear as the nature of the invention is better understood, the same consists in the novel construction, combination, and arrangement of parts hereinafter more fully described, illustrated, and claimed.

In the drawings, Figure 1 is a vertical sectional view of a steam-separating trap embodying the improvements contemplated by the present invention and showing the positions of the various parts when the trap is at rest and water accumulating within the bucket-float. Fig. 2 is a similar view of the lower portion of the trap, showing the positions of the various parts when the trap is exhausting through the siphon discharge-pipe. Fig. 3 is an enlarged detail sectional view of the valve-case fitting for the discharge-pipe and the discharge-valve and piston arranged therein.

Referring to the accompanying drawings, the numeral 1 designates the upright trap-casing, preferably consisting of the upper and lower sections 2 and 3, flanged and bolted together at their contiguous edges, and said casing is provided near the top thereof with the oppositely-located steam inlet and outlet necks 4 and 5, respectively, which are adapted to have coupled thereto the line of piping carrying the supply of steam to be subjected to the separating action of the trap. A vertically-arranged baffle-plate 6 is fitted within the upper portion of the casing between the steam inlets and outlets 4 and 5 and terminates short of the casing-top, said baffle-plate being provided at its lower end with a lateral outwardly and downwardly inclined flange 7, which terminates short of the adjacent wall of the casing to provide a passage for the water of condensation. The baffle-plate 6 forms no part of the present invention, as the same is fully disclosed in the pending application hereinbefore referred to; but said plate coöperates with the bucket-float 8, arranged to work within the lower portion of the casing, by intercepting the moisture-laden steam entering the inlet 4 and causing the moisture contained in the steam to be condensed, separated therefrom, and deflected downward into the bucket-float 8, while the dry steam is permitted to pass over the upper end of the baffle-plate and thence through the outlet 5.

In the use of the trap the lower or bottom portion of the casing 1, which constitutes the water-chamber of the apparatus, is designed to hold sufficient water to buoy up or float the bucket 8 when the latter is empty, and at any time should it be desired to draw off the water from the bottom of the casing and blow out the accumulated sediment this may be accomplished by opening the valve 9 of the drain-pipe 10, fitted to the bottom head of the trap-casing and communicating with the interior thereof; but, as already stated, there is normally sufficient water in the bottom of the trap-casing to buoy up or float the bucket 8.

To provide for automatically removing the accumulations of water within the bucket-float 8 from time to time, there is employed a siphon discharge-pipe 11, arranged exterior to the trap-casing and provided with an interior pendent inlet-limb 12, arranged wholly within the trap-casing and extending within the bucket-float 8 to a point in close proximity to the bottom of the bucket, whereby only a trifling amount of water is left in the bucket when the steam has blown out through the discharge-pipe as much of the accumulated water as possible.

The horizontal portion of the discharge-pipe 11 exterior to the trap-casing has coupled thereto a valve-case fitting 13, having intermediate its ends a lateral outlet-neck 14, communicating with the main discharge-limb of the discharge-pipe, and contiguous to the inlet end thereof the valve-case fitting 13 is formed with a valve-chamber 15, having an annular beveled valve-seat 16 and housing therein a discharge-valve 17. The discharge-valve 17 is provided with a beveled face 18, adapted to register with the valve-seat 16, and upon the side opposite said beveled face with a plurality of offstanding spacing-lugs 19, which are adapted to abut against the contiguous end of the discharge-piping to space the valve therefrom when the water is discharging through the valve-chamber 15 and into the outlet-neck 14 of the valve-case fitting. The valve-case fitting 13 is provided at one side of the valve-chamber 15 with a central longitudinal guide-bore 20 in communication with the outlet-neck 14 and receiving therein the elongated winged guide-stem 21, projected from one side of the discharge-valve 17, and normally one end of the guide-stem of the discharge-valve 17 projects into the steam-chamber or steam-cylinder 22, projected from the end of the valve-case 13 opposite the valve-chamber 15 and of a greater diameter than said valve-chamber 15. The steam chamber or cylinder 22 loosely receives for reciprocation therein the piston 23, provided with a longitudinal relief-port 24, extending from end to end thereof and also provided at one end with a stop projection 25, adapted to strike against the outer end of the steam chamber or cylinder to limit the outward movement of the piston.

The steam chamber or cylinder containing the piston 23 has coupled thereto near its outer end one end of a steam-pipe 26, the other end of which pipe extends within the trap-casing 1 above the plane of the bucket-float 8 and is provided within the trap-casing with an upwardly-disposed extension 27, having a valve-seat 28, adapted to receive the steam-controlling valve 29. The steam-controlling valve 29 has connected thereto one end of an adjusting-lever 30, pivotally supported at a point between its ends, as at 31, and pivotally connected at the end opposite the valve 29 to a stem 32, projected from the bucket-float 8 and rigidly fastened thereto. Normally when the bucket-float 8 is empty and buoyed up by the water within the bottom part of the trap-casing the adjusting-lever 30 is tilted in a direction which necessarily closes the steam-controlling valve 29, and thereby cuts off communication through the steam-pipe 26, so that the internal steam-pressure within the trap-casing will exert its force against the discharge-valve 17 and close said valve against its seat 16, thus cutting off the flow of water through the siphon discharge-pipe and permitting the water of condensation to accumulate in the bucket-float. Now as the bucket becomes filled or partially filled with the water of condensation the same sinks within the water in the bottom part of the trap-casing, and thereby oscillates the adjusting-lever 30 in a direction which causes the steam-controlling valve 29 to open and permit the steam under full pressure to pass through the steam-pipe 26 and exert its force against the outer side of the piston 23. The piston 23, being of a greater area than the discharge-valve 17, will unseat the latter, and thereby open up communication through the discharge-pipe 11 and allow the accumulated water to be blown out through said pipe by the internal pressure of steam within the trap-casing. When the bucket has been relieved of the weight of accumulated water, the same again rises and closes the valve 29, thus relieving the piston 23 from steam-pressure and allowing the internal pressure of steam to exert its force against the discharge-valve and close the latter until the bucket has again filled and the operation described repeats itself.

In connection with the operation of the piston and the discharge-valve it may be observed at this point that by reason of the internal pressure of steam normally seating the discharge-valve and being relieved from the piston 23 there can be no leak through the piston, as might be possible with the construction shown in the pending application referred to, as in the latter construction there is a pressure of steam exerted against both the valve and the piston at all times.

In order that the apparatus may be inspected and controlled at any time desired, the discharge-pipe between the valve-case 13 and the trap-casing is provided with a globe or cut-off valve 33 and the steam-pipe 26 is also provided with a similar valve 34, and in order to permit of the water being blown out of the bucket at any time desired the auxiliary steam-pipe 35 is brought into play. This pipe connects the interior of the trap-casing with the outer portion of the steam chamber or cylinder 22 and is provided with a cut-off or globe valve 36, and in connection with the operation of the piston 23 it is to be noted that the longitudinal relief-port 24 thereof relieves the piston of back pressure by providing communication between the outer portion of the steam-chamber and the outlet-neck 14 when the bucket 8 rises and closes the controlling-valve 29, so that the internal pressure will seat the valve 17.

Changes in form, proportion, and the minor details of construction may be resorted to

Having thus described the invention, what is claimed as new, and desired to be secured by Letters Patent, is—

1. In a steam-separating trap, the combination of the casing, a float arranged in the lower portion of the casing, a discharge-pipe communicating with the interior of the trap-casing, a valve-case fitting applied to the discharge-pipe, a discharge-valve and a piston mounted within separate portions of the valve-case fitting and arranged in contiguous contacting relation, a steam-pipe connected at one end with the valve-case fitting at one side of the piston therein, and having its other end connected with the trap-casing, a steam-controlling valve applied to the inner or receiving end of the steam-pipe, and an adjusting connection between said valve and the float, said adjusting connection being arranged to provide for closing the steam-controlling valve when the float is in its elevated position, substantially as set forth.

2. In a steam-separating trap, the combination of the casing a siphon discharge-pipe communicating with the interior of the trap-casing, a valve-case fitting applied to the discharge-pipe and provided at one end with a valve-chamber, an enlarged steam-chamber at the end opposite the valve-chamber, and an intermediate guide-bore, a discharge-valve arranged within the valve-chamber and provided with a stem extended through said guide-bore, a piston of a greater area than the discharge-valve mounted within said steam-chamber, a steam-pipe connecting said steam-chamber of the valve-case fitting with the trap-casing, a valve applied to the inner or receiving end of the said steam-pipe and float-controlled means for normally cutting off the supply of steam from said steam-pipe, said means being adjustably connected to the latter valve, substantially as set forth.

3. In a steam-separating trap, the combination of the casing, a discharge-pipe communicating with the interior of the trap-casing, a valve-case fitting applied to the discharge-pipe and provided at one end with a valve-chamber, an enlarged steam-chamber at the opposite end, and an intermediate guide-bore, a discharge-valve arranged within the valve-chamber and provided with a stem extended through said guide-bore, a piston of greater area than the discharge-valve mounted within said steam-chamber, said piston being provided with a longitudinal relief-port, a steam-pipe connecting said steam-chamber of the valve-case fitting with the trap-casing, float-controlled means for normally cutting off the supply of steam from said steam-pipe, and a valved auxiliary steam-pipe connecting said steam-chamber of the valve-case fitting with the trap-casing, substantially as set forth.

In testimony that we claim the foregoing as our own we have hereto affixed our signatures in the presence of two witnesses.

JOHN R. COX.
WILLIAM H. REYNOLDS.
GEO. H. WRIGHT.

Witnesses:
JAMES S. MONTGOMERY,
PHIL FROST.